(12) United States Patent
Adedeji

(10) Patent No.: US 6,414,084 B1
(45) Date of Patent: Jul. 2, 2002

(54) HIGH FLOW POLYPHENYLENE ETHER FORMULATIONS WITH DENDRITIC POLYMERS

(75) Inventor: Adeyinka Adedeji, Albany, NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/548,855

(22) Filed: Apr. 13, 2000

(51) Int. Cl.⁷ .................................................. C08L 71/12
(52) U.S. Cl. ..................... 525/133; 525/68; 525/92 D; 525/132; 525/133; 525/391; 525/397
(58) Field of Search ................................ 525/397, 133, 525/132, 391, 68, 92 D

(56) References Cited

U.S. PATENT DOCUMENTS

| | | |
|---|---|---|
| 2,933,480 A | 4/1960 | Gresham |
| 3,093,621 A | 6/1963 | Gladding |
| 3,211,709 A | 10/1965 | Adamek et al. |
| 3,257,357 A | 6/1966 | Stamatoff |
| 3,257,358 A | 6/1966 | Stamatoff |
| 3,306,874 A | 2/1967 | Hay |
| 3,306,875 A | 2/1967 | Hay |
| 3,646,168 A | 2/1972 | Barrett |
| 3,790,519 A | 2/1974 | Wahlborg |
| 3,884,993 A | 5/1975 | Gros |
| 3,894,999 A | 7/1975 | Boozer et al. |
| 3,914,266 A | 10/1975 | Hay |
| 4,028,341 A | 6/1977 | Hay |
| 4,059,654 A | 11/1977 | Von Bodungen et al. |
| 4,097,550 A | 6/1978 | Haaf et al. |
| 4,154,712 A | 5/1979 | Lee, Jr. |
| 4,166,055 A | 8/1979 | Lee, Jr. |
| 4,584,334 A | 4/1986 | Lee. Jr. et al. |
| 4,806,297 A | 2/1989 | Brown et al. |
| 4,806,602 A | 2/1989 | White et al. |
| 4,816,510 A | 3/1989 | Yates, III |
| 4,935,472 A | 6/1990 | Brown et al. |
| 5,081,185 A | 1/1992 | Haaf et al. |
| 5,089,566 A | 2/1992 | Brown et al. |
| 5,231,146 A | 7/1993 | Brown et al. |
| 5,237,005 A | 8/1993 | Yates, III |
| 5,258,455 A | 11/1993 | Laughner et al. |
| 5,290,881 A | 3/1994 | Dekkers |
| 5,376,724 A | 12/1994 | Bailly et al. |
| 5,418,301 A | 5/1995 | Hult et al. |
| 5,461,096 A | 10/1995 | Bopp et al. |
| 5,530,092 A | 6/1996 | Meijer et al. |
| 5,587,446 A | 12/1996 | Frechet et al. |
| 5,663,247 A | 9/1997 | Sorensen et al. |
| 5,731,095 A | 3/1998 | Milco et al. |
| 5,830,986 A | 11/1998 | Merrill et al. |
| 5,859,130 A | 1/1999 | Gianchandai et al. |
| 5,916,970 A | 6/1999 | Lee, Jr. et al. |
| 5,981,656 A | 11/1999 | McGaughan et al. |
| 5,998,565 A | 12/1999 | de Brabander-van den Berg |

FOREIGN PATENT DOCUMENTS

| | | |
|---|---|---|
| EP | 0 814 097 A2 | 12/1997 |
| WO | 96/01865 | 1/1996 |
| WO | 97/19987 | 5/1997 |
| WO | 97/45474 | 12/1997 |

OTHER PUBLICATIONS

Safety Data Sheet, "Boltorn H 20" by Perstop Specialty Chemicals, Apr. 21, 1998, p. 1.
European Plastic News, "Dendritic Additives Present Advantages for Thermoplastics", Mar. 1999 (10 pages).
Chapter 3 of Organic Polymer Chemistry, 2nd Edition, KG. Saunders, Chapman and Hall, 1988.

Primary Examiner—Patricia A. Short

(57) ABSTRACT

High flow polyphenylene ether formulations are obtained with the addition of dendritic polymers. High flow is also obtained with the addition of dendritic polymers to flame retardant polyphenylene ether formulations.

39 Claims, No Drawings

HIGH FLOW POLYPHENYLENE ETHER FORMULATIONS WITH DENDRITIC POLYMERS

BACKGROUND OF THE INVENTION

1. Field of the Invention

This invention relates to polyphenylene ether resins, and more particularly polyphenylene ether formulations with improved flow.

2. Brief Description of Related Art

Polyphenylene ether resins (PPE) are an extremely useful class of high performance engineering thermoplastics by reason of their hydrolytic stability, high dimensional stability, toughness, heat resistance and dielectric properties. They also exhibit high glass transition temperature values, typically in the range of 150° to 210° C., and good mechanical performance. This unique combination of properties renders polyphenylene ether based formulations suitable for a broad range of applications which are well known in the art. One example is injection molded products which are used for high heat applications. Polyphenylene ether polymers typically have relatively high molecular weights and possess high melt viscosity with intrinsic viscosity values typically greater than about 0.4 dl/g as measured in chloroform at 25° C.

One area in which polyphenylene ether based compositions have required an improvement is melt flow capability, i.e. the ability to flow freely at elevated temperatures during various processing stages such as extrusion and molding. Poor melt flow can impact the size and type of the part which can be prepared with the composition and influence the type of equipment in which the composition is processed. In U.S. Pat. No. 4,154,712 to G. Lee Jr. teaches that processability can be improved by decreasing the molecular weight of the polyphenylene ether polymers; however, lower molecular weight sometimes adversely affects other properties such as impact strength. To aid processing, polyphenylene ether resins are often prepared with flow promoters, such as polystyrene, saturated polyalicyclic resins and terpene phenol to reduce viscosity and impart high flow to the resulting composition. Polystyrene, terpene phenol and other such flow promoters reduce the heat deflection temperature (HDT) of the product and typically increase the flammability of the PPE resin, as measured under UL94 standard protocol.

Efforts to improve the flow characteristics of PPE resins with minimal or no loss of HDT values and impact other properties have been made. For example, U.S. Pat. No. 5,081,185 to Haaf et al. describes compositions comprising a blend of two or more polyphenylene ether resins with one resin having high intrinsic viscosity values of at least about 3.8 dl/g and the other having low intrinsic viscosity values of no greater than 0.33 dl/g. The blend of the two PPE resins exhibits higher melt flow with no substantial decrease in heat deflection temperature (HDT) when compared to the high intrinsic viscosity PPE resin of the blend. In addition, U.S. Pat. No. 5,376,724 to Bailey et al. discloses polyphenylene ether compositions which contain a resinous additive that improves flow with only minor reductions in HDT values and impact strength. The resinous additive is said to comprise vinyl aromatic monomers such as sytrene monomers or a hydrocarbon compound containing at least 35 wt % aromatic units.

It is desirable to provide a PPE resin formulation with high flow characteristics with reduced loadings of flow modifier to minimize the impact on HDT values, impact properties and flame retardance.

SUMMARY OF THE INVENTION

The present invention provides blends of polyphenylene ether resin, and dendritic polymers. It has been discovered that substantially equivalent improvements in the flow properties of compositions containing polyphenylene ether resins can be obtained with smaller amounts of dendritic polymers when compared to conventional flow modifying additives. The polyphenylene ether resin preferably has an intrinsic viscosity of at least about 0.35 dl/g, most often in the range of about 0.4–0.6 dl/g, as measured in chloroform at 25° C. This polyphenylene ether resin can comprise one or more different polyphenylene ether polymers. The dendritic polymers preferably have a melt viscosity in the range of 1 to 250 Pa at a temperature of 110° C. and shear rate of 30 sec$^{-1}$. Preferably, the dendritic polymers are based on polyesters or polyolefins. The compositions of this invention preferably contain at most 15% by weight of the dendritic polymers. The weight ratio of polyphenylene ether resin to the dendritic polymer is preferably greater than 4:1.

The polyphenylene ether polymers of the polyphenylene ether resins used in compositions of the present invention are known polymers comprising a plurality of aryloxy repeating units preferably with at least 50 repeating units of Formula I

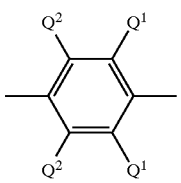

I wherein in each of said units independently, each $Q^1$ is independently halogen, alkyl (preferably primary or secondary lower alkyl containing up to 7 carbon atoms), aryl (preferably phenyl), halohydrocarbon groups (preferably haloalkyl) having at least two carbons between the halogen atoms and the phenyl nucleus of Formula I, aminoalkyl, hydrocarbonoxy or halohydrocarbonoxy wherein at least two carbon atoms separate the halogen and oxygen atoms and at least two carbon atoms separate the halogen atoms and the phenyl nucleus of Formula I.

Each $Q^2$ is independently hydrogen, halogen, alkyl (preferably primary or secondary lower alkyl up to 7 carbon atoms), aryl (preferably phenyl), halohydrocarbon (preferably haloalkyl) having at least two carbon atoms between the halogen atoms and the phenyl nucleus of Formula I, hydrocarbonoxy groups or halohydrocarbonoxy groups wherein at least two carbon atoms separate the halogen and oxygen atoms and at least two carbon atoms separate the halogen atoms from the phenyl nucleus of Formula I. Each $Q^1$ and $Q^2$ suitably contain up to about 12 carbon atoms and most often, each $Q^1$ is an alkyl or phenyl, especially $C_1$–$C_4$ alkyl and each $Q^2$ is hydrogen.

The term "polyphenylene ether resin," as used in the specification and claims herein, includes unsubstituted polyphenylene ether polymers, substituted polyphenylene ether polymers wherein the aromatic ring is substituted, polyphenylene ether copolymers and blends thereof. Also included are polyphenylene ether polymers containing moieties prepared by grafting onto the polyphenylene ether in a known manner such materials as vinyl monomers or polymers such a polystyrenes and elastomers, as described in U.S. Pat. No. 5,089,566 issued to S. Bruce Brown. Coupled polyphenylene ether polymers in which coupling agents such as low molecular weight polycarbonates, quinones, heterocycles and formals undergo reaction in the known manner with the hydroxy groups of two phenyl ether chains to produce a high molecular weight polymer are also included.

The polyphenylene ether polymers used in the compositions of this invention may also have various end groups such as amino alkyl containing end groups and 4-hydroxy biphenyl end groups, typically incorporated during synthesis by the oxidative coupling reaction. The polyphenylene ether polymers may be functionalized or "capped" with end groups which add further reactivity to the polymer and in some instances provide additional compatibility with other polymer systems which may be used in conjunction with the polyphenylene ether polymers to produce an alloy or blend. For instance, the polyphenylene ether polymer may be functionalized with an epoxy end group, a phosphate end group or ortho ester end group by reacting a functionalizing agent such as 2-chloro-4(2-diethylphosphato epoxy)6-(2,4,6-trimethyl-phenoxy)-1,3,5-trizene, with one of the end groups of the polyphenylene ether polymer, i.e., one of the terminal hydroxyl groups.

It will be apparent to those skilled in the art from the foregoing that the polyphenylene ether polymers contemplated for use in the present invention include all of those presently known, irrespective of the variations in structural units.

Specific polyphenylene ether polymers useful in the present invention include but are not limited to
poly(2,6-dimethyl-1,4-phenylene ether);
poly(2,3,6-trimethyl-1,4-phenylene)ether;
poly(2,6-diethyl-1,4-phenylene)ether;
poly(2-methyl-6-propyl-1,4-phenylene)ether;
poly(2,6-dipropyl-1,4-phenylene)ether;
poly(2-ethyl-6-propyl-1,4-phenylene)ether;
poly(2,6-dilauryl-1,4-phenylene)ether;
poly(2,6-diphenyl-1,4-phenylene)ether;
poly(2,6-dimethoxy-1,4-phenylene)ether;
poly(2,6-diethoxy-1,4-phenylene)ether;
poly(2-methoxy-6-ethoxy-1,4-phenylene)ether;
poly(2-ethyl-6-stearyloxy-1,4-phenylene)ether;
poly(2,6-dichloro-1,4-phenylene)ether;
poly(2-methyl-6-phenyl-1,4-phenylene)ether;
poly(2-ethoxy-1,4-phenylene)ether;
poly(2-chloro-1,4-phenylene)ether;
poly(2,6-dibromo-1,4-phenylene)ether;
poly(3-bromo-2,6-dimethyl-1,4-phenylene)ether; mixtures thereof, and the like.

Suitable copolymers include random copolymers containing 2,6-dimethyl-1,4-phenylene ether units and 2,3,6-trimethyl-1,4-phenylene ether units.

The polyphenylene ether resins employed in the compositions of this invention have an intrinsic viscosity greater than about 0.2 dl/g, as measured in chloroform at 25° C., and generally have a number average molecular weight within the range of about 3,000 to 40,000 and a weight average molecular weight in the range of 20,000 to 80,000, as determined by gel permeation chromatography.

The polyphenylether ether polymers suitable for use in this invention may be prepared by any of a number of processes known in the art from corresponding phenols or reactive derivatives thereof. Polyphenylene ether resins are typically prepared by the oxidative coupling of at least one monohydroxy aromatic compound such as 2,6-xylenol or 2,3,6-trimethylphenol. Catalysts systems are generally employed for such coupling and contain at least one heavy metal compound such as copper, manganese, or cobalt compounds, usually in combination with various other materials. Catalyst systems containing a copper compound are usually combinations of cuprous or cupric ions, halide (e.g., chloride, bromide, or iodide)ions and at least one amine such as cuprous chloride-trimethylamine. Catalyst systems which contain manganese compounds are generally alkaline systems in which divalent manganese is combined with such anions as halide, alkoxide or phenoxide. Most often, the manganese is present as a complex with one or more complexing and/or chelating agents such as dialkylamines, alkylenediamines, o-hydroxy aromatic aldehydes, o-hydroxyazo compounds and o-hydroxyaryl oximes. Examples of manganese containing catalysts include manganese chloride- and manganese chloride-sodium methylate. Suitable cobalt type catalyst systems contain cobalt salts and an amine.

Examples of catalyst systems and methods for preparing polyphenylether resins are set forth in U.S. Pat. Nos. 3,306,874, 3,306,875, 3,914,266 and 4,028,341 (Hay); U.S. Pat. Nos. 3,257,357 and 3,257,358 (Stamatoff); U.S. Pat. Nos. 4,935,472 and 4,806,297 (S. B. Brown et al.); and U.S. Pat. No. 4,806,602 issued to Dwayne M. White et al.

In general, the molecular weight of the polyphenylene ether resins can be controlled by controlling the reaction time, the reaction temperature and the amount of catalyst. Longer reaction times will provide a higher average number of repeating units and a higher intrinsic viscosity. At some point, a desired molecular weight (intrinsic viscosity) is obtained and the reaction terminated by conventional means. For example, in the case of reaction systems which make use of a complex metal catalysts, the polymerization reaction may be terminated by adding an acid, e.g., hydrochloric acid, sulfuric acid and the like or a base e.g., potassium hydroxide and the like or the product may be separated from the catalyst by filtration, precipitation or other suitable means as taught by Hay in U.S. Pat. No. 3,306,875.

The term dendritic polymers as used herein refers to both dendrimers and hyperbranched polymers known in the art. Dendrimers and hyperbranched polymers suitable for use in this invention are well defined, highly branched macromolecules that radiate from a central core and are synthesized through a stepwise repetitive branching reaction sequence. Those preferred herein are the star or starburst dendritic polymers having a multifunctional core with radial branching units which extend from the core. The repetitive branching sequence typically guarantees complete shells for each generation, lending to polymers that are typically monodisperse. The synthetic procedures for dendritic polymer preparation often provide nearly complete control over the size, shape, surface/interior chemistry, flexibility and topology. This invention includes the use of dendritic polymers with complete and symmetrical branches as well as incomplete and asymmetric branches. An example of a suitable synthesis method is to employ a multifunctional compound, such as ethylene diamine as a core building block. This multifunctional core is first reacted with acrylonitrile to provide a structure with four nitrile groups. These nitrile groups are reduced to amine units to complete the first cycle. Further reaction cycles prepare dendritic polymers with 8, 16, 32, 64, 128, etc. primary amino groups. The terminal ends of these branching units can be functionalized, if desired, with conventional functional units for dendritic polymers such as hydroxy groups, epoxy groups and ether groups.

The weight average molecular weight of preferred dendritic polymers can range from about 1,000 to about 21,000 and is preferably from about 1,500 to about 12,000, as determined by gel permeation chromatography. When attempting to increase flow, the most preferred values are at the low end of the molecular weight range of from about 1,500 to about 5,000. Preferably the polymers have a narrow polydispersity of from about 1.3 to about 1.5 and a melt viscosity of 1 to 250 Pa at a temperature of 110° C. and shear rate of 30 sec$^{-1}$. The dendritic polymers used in the present invention can optionally be functionalized either in the core or at the periphery of the branching units. Polar groups and non-polar may be bonded to the periphery of the dendritic polymers as desired, depending on the nature of the polyphenylene ether formulation. Preferably, hydroxy and/or epoxy groups are bound at the terminal ends of the dendritic polymers used in this invention.

The molecules that can be used as a core contain at least one functional group and preferably contain multiple functional groups. These include ammonia, methanol, polymethylene diamines, diethylene triamine, triethylene tetramine, tetraethylene pentamine, linear and branched polyethylene imine, methylamine, hydroxyethylamine, octadecylamine, polyaminoalkylarenes, heterocyclic amines such as imidazolines and piperidines, morpholine, piperazine, pentaerythritol, sorbitol, mannitol, polyalkylenepolyols such as polyethylene glycol and polypropylene glycol, glycols such as ethylene glycol, polyalkylene polymercaptans, phosphine, glycine, thiophenols, phenols, melamine and derivatives thereof such as melamine tris (hexamethylenediamine).

The branching units can comprise a variety of polymers which are derived from units typically having two distinct functional groups at different ends. Examples of these simple polymers include polyesters, polyethers, polyolefins, polythioethers, polyamides, polyetherketones, polyalkyleneimines, polyamidoamines, polyetheramides, polyarylenes, polyalkylenes, aromatic polyalkylenes, polyarylacetylenes and combinations thereof. Examples of suitable dendritic polymers are described in U.S. Pat. No. 5,530,092 (Meijer et al.); U.S. Pat. No 5,998,565 (Debrabander-Bandenberg et al.); U.S. Pat. No 5,418,301 (Hult et al.) and U.S. Pat. No 5,663,247 (Sorensen et al.).

Preferred dendritic polymers are based on polyesters. Those which are most preferred are the dendritic polymers sold under the trademark BOLTORN® available from Perstorp Specialty Chemicals, Perstorp, Sweden. Of this series, BOLTORN H20 and BOLTORN H30 dendritic polymers, which are functionalized with hydroxy groups at the periphery, are preferred and have a weight average molecular weight in the range of about 1,000 to about 4,000.

Suitable central initiator molecules for the polyester type dendritic polymers include cycloaliphatic or aromatic diols, triols, tetraols, sorbitol, manitol, dipentaerythritol, a monofunctional alcohol and an alkoxylate polymer having a molecular weight less than 2000. Examples of suitable diols include 1,3-propanediol, 1,2-propanediol, 1,3-butanediol, 1,2-ethanediol, 1,4-butanediol, 1,5-pentanediol, 1,6-hexanediol and polytetrahydrofuran.

Suitable polyester chain extenders are monofunctional carboxylic acids having at least two hydroxyl groups such as α,α-bis(hydroxymethyl)-propionic acid, α,α-bis(hydroxymethyl)-butyric acid, α,α,α-tris(hydroxymethyl)-acetic acid, α,α-bis(hydroxymethyl)-bularic acid, α,α-bis(hydroxymethyl)-propionic acid, α,β-dihydroxypropionic acid, heptonic acid, citric acid, d- or l-tartaric acid or α-phenylcarboxylic acids such as 3,5-dihydroxybenzoic acid.

The optional chain terminating agents which can be used include saturated monofunctional carboxylic acids, saturated fatty acids, unsaturated monofunctional carboxylic acids, aromatic monofunctional carboxylic acids such as benzoic acid and difunctional or polyfunctional carboxylic acids or anhydrides thereof. An example is behenic acid. Terminal hydroxyl groups in the polyester chain extender can be reacted with chain stoppers with or without functional groups. Suitable polyester-based dendritic polymers are described in U.S. Pat. Nos. 5,418,301 and 5,663,247.

Other suitable chain extenders include aliphatic di, tri or polyhydroxyfunctional saturated or unsaturated monocarboxylic acids, cycloaliphatic di, tri or polyhydroxyfinctional saturated or unsaturated monocarboxylic acids, aromatic di, tri or polyhydroxyfunctional monocarboxylic acids, aliphatic monohydroxyfunctional saturated or unsaturated di, tri or polycarboxylic acids, cycloaliphatic monohydroxy functional saturated or unsaturated di, tri or polyhydroxycarboxylic acids and aromatic monohydroxy functional di, tri or polycarboxylic acids. The esters of the above acids are also suitable.

The dendritic polymer is preferably used in the compositions of this invention in an amount which ranges from about 0.1 to about 15 wt % of the total composition to provide a useful balance of properties. More preferably, an amount of dendritic polymers from about 1 to about 10 wt % of the total composition is used to improve flow and even more preferably, from about 2 to about 6 wt % of the total composition and most preferably from about 2 to about 4 wt % of the total composition is used to improve flow while minimizing the loss of HDT values. Although not preferred, the dendritic polymer can be used in the compositions of this invention in amounts up to 30 wt %.

The compositions of this invention can be blended with other components in amounts that vary widely. Most often the composition of this invention is employed in an amount in the range of about 5 to 95% by weight with additives and other resins making up the difference. However, this invention includes high flow compositions which comprise exclusively polyphenylene ether resin and dentritic polymers. Other components which can be added to the compositions of this invention include conventional additives and resins conventionally added to PPE formulations.

Various resins may be blended with the compositions of this invention such as vinyl aromatic resins, polyamides as disclosed in U.S. Pat. Nos. 5,981,656 and 5,859,130, polyarylene sulfides as disclosed in U.S. Pat. No. 5,290,881, polyphthalamides as disclosed in U.S. Pat. No. 5,916970, polyether amides as disclosed in U.S. Pat. No. 5,231,146 and polyesters as disclosed in U.S. Pat. No 5,237,005.

The vinyl aromatic resins within the compositions of this invention comprise polymers that contain at least 25% by weight of structural units derived from a monomer of the formula:

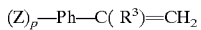

$$(Z)_p\text{—Ph—C}(R^3)\text{=CH}_2$$

where Ph is phenyl, $R^3$ is hydrogen, lower alkyl or halogen, Z is vinyl, halogen or lower alkyl and p is 0 to 5. These vinyl aromatic polymers include homopolystyrene, polychlorostyrene, polyvinyltoluene, and rubber modified polystyrene (sometimes referred to as "HIPS") comprising blends and grafts with elastomeric polymers, as well as mixtures of these materials. Styrene-containing copolymers such as styrene-acrylonitrile copolymers (SAN), styrene-maleic anhydride copolymers, polyalpha-methylstyrene and copolymers of ethylvinylbenzene, divinylbenzene are also suitable.

The vinyl aromatic polymers are prepared by methods well recognized in the art including bulk, suspension and emulsion polymerization. The amount of vinyl aromatic resin present within the compositions of this invention depends on the properties contemplated and typically ranges from about 5% to 90% by weight, preferably from about 15% to about 60% by weight, based on the weight of the total composition.

Examples of suitable polystyrene resins are generally known in the art and are described for example in Chapter 3 of Organic Polymer Chemistry, $2^{nd}$ edition K. G. Saunders, Chapman and Hall, 1988 and in U.S. Pat. No. 4,816,510, issued to John B. Yates, III.

The use of various additives which may impart a variety of attributes to the compositions of this invention is also within the scope of this invention. Most additives are well known in the art as are their effective levels and methods of incorporation. Examples of such additives are impact modifiers, flame retardants, plasticizers, antioxidants, fillers, conductive fillers (e.g., conductive carbon black, carbon fibers, stainless steel fibers, metal flakes and metal powders) reinforcing agents, (e.g., glass fibers), stabilizers (e.g., oxidative, thermal and ultraviolet stabilizers), antistatic agents, lubricants, colorants, dyes, pigments, drip retardants, flow modifiers and other processing aids.

Materials which enhance the impact strength of the compositions of this invention are not critical but are sometimes desirable. Suitable materials include natural and synthetic elastomeric polymers such as natural rubbers, synthetic rubbers and thermoplastic elastomers. They are typically derived from monomers such as olefins (e.g., ethylene, propylene, 1-butene, 4-methyl-1-pentene)alkenylaromatic monomers, (e.g., styrene and alphamethyl styrene) conjugated dienes (e.g., butadiene, isoprene and chloroprene) and vinylcarboxylic acids and their derivatives (e.g., vinylacetate, acrylic acid, alkylacrylic acid, ethylacrylate, methyl methacrylate acrylonitrile). They may be homopolymers as well as copolymers including random, block, graft and core shell copolymers derived from these various suitable monomers discussed more particularly below.

Polyolefins which can be included within the compositions of this invention are of the general structure: $C_nH_{2n}$ and include polyethylene, polypropylene and polyisobutylene with preferred homopolymers being polyethylene, LLDPE (linear low density polyethylene), HDPE (high density polyethylene) and MDPE (medium density polyethylene) and isotatic polypropylene. Polyolefin resins of this general structure and methods for their preparation are well known in the art and are described for example in U.S. Pat. Nos. 2,933,480, 3,093,621, 3,211,709, 3,646,168, 3,790,519, 3,884,993, 3,894,999, 4,059,654, 4,166,055 and 4,584,334.

Copolymers of polyolefins may also be used such as copolymers of ethylene and alpha olefins like propylene and 4-methylpentene-1. Copolymers of ethylene and $C_3$–$C_{10}$ monoolefins and non-conjugated dienes, herein referred to as EPDM copolymers, are also suitable. Examples of suitable $C_3$–$C_{10}$ monoolefins for EPDM copolymers include propylene, 1-butene, 2-butene, 1-pentene, 2-pentene, 1-hexene, 2-hexene and 3-hexene. Suitable dienes include 1,4 hexadiene and monocylic and polycyclic dienes. Ratios of ethylene to other $C_3$–$C_{10}$ monoolefin monomers can range from 95:5 to 5:95 with diene units being present in the amount of from 0.1 to 10 mol %. EPDM copolymers can be functionalized with an acyl group or electrophilic group for grafting onto the polyphenylene ether as disclosed in U.S. Pat. No. 5,258,455.

Polyolefins are typically present in an amount from about 0.1% to about 10% by weight based on the total weight of the composition. Where the polyolefin is an EPDM, the amount is generally from 0.25% by weight to about 3% by weight of the composition.

Suitable materials for impact modification include conjugated diene homopolymers and random copolymers. Examples include polybutadiene, butadiene-styrene copolymers, butadiene-acrylate copolymers, isoprene-isobutene copolymers, chlorobutadiene polymers, butadiene acrylonitrile polymers and polyisoprene. These impact modifiers may comprise from about 1 to 30 weight percent of the total composition.

A particularly useful class of impact modifiers with conjugated dienes comprises the AB (di-block), $(AB)_m$—R (di-block) and ABA' (tri-block) block copolymers. Blocks A and A' are typically alkenyl aromatic units and Block B is typically a conjugated diene unit. For block copolymers of formula $(AB)_m$—R, integer m is at least 2 and R is a multifunctional coupling agent for the blocks of the structure AB.

Also useful are core shell graft copolymers of alkenyl aromatic and conjugated diene compounds. Especially suitable are those comprising styrene blocks and butadiene, isoprene or ethylene-butylene blocks. Suitable conjugated diene blocks include the homopolymers and copolymers described above and they may be partially or entirely hydrogenated by known methods whereupon they may be represented as ethylene-propylene blocks or the like and have properties similar to those of olefin block copolymers. The suitable alkenyl aromatics include styrene, alpha-methyl styrene, para-methyl styrene, vinyl toulene, vinyl xylene and vinyl napthalene. The block copolymer preferably contains from about 15 to 50% alkenyl aromatic units. Examples of triblock copolymers of this type are polystyrene-polybutadiene-polystyrene (SBS), hydrogenated polystyrene-polybutadiene-polystyrene (SEBS), polystyrene-polyisoprene-polystyrene (SIS) and poly(alpha methylstyrene)-polyisoprene-poly(alpha methylstyrene). Examples of commercially available triblock copolymers are the CARIFLEX®, KRATON D® and KRATON G® series from Shell Chemical Company.

Also included are impact modifiers comprising a radial block copolymer of a vinyl aromatic monomer and a conjugated diene monomer. Copolymers of this type generally comprise about 60 to 95 wt % polymerized vinyl aromatic monomer and about 40 to 5 wt % polymerized conjugated diene monomer. The copolymer has at least three polymer chains which form a radial configuration. Each chain terminates in a substantially nonelastic segment, to which the elastic polymer segment is joined. These block copolymers are sometimes referred to as "branched" polymers as described in U.S. Pat. No. 4,097,550 and are used in amounts analogous to other conjugated diene based impact modifiers.

The compositions of this invention can be rendered flame retardant with the use of flame retardant additives known in the art including halosubstituted diaromatic compounds such as 2,2-bis-(3,5-dichlorophenyl)propane, as described in U.S. Pat. No. 5,461,096 and phosphorous compounds as described in U.S. Pat. No. 5,461,096. Other examples of halosubstituted diaromatic flame retardant additives include brominated benzene, chlorinated biphenyl, brominated polystyrene, chlorine containing aromatic polycarbonates or compounds comprising two phenyl radicals separated by a divalent alkenyl group and having at least two chlorine or two bromine atoms per nucleus, and mixtures thereof.

The preferred flame retardant compounds employed in the compositions of the present invention are free of halogen. These preferred compounds include phosphorous compounds selected from elemental phosphorous, organic phosphonic acids, phosphonates, phosphinates, phosphinites, phosphine oxides such as triphenylphosphine oxide, phosphines, phosphites and phosphates. Typical of the preferred phosphorous compounds are those of the general formula: $O=P-(OZ)_3$, and nitrogen analogs of these phosphorous compounds. Each Z represents the same or different radicals including hydrocarbon radicals such as alkyl, cycloalkyl, aryl, alkyl substituted aryl and aryl substituted alkyl; halogen, hydrogen, and combinations thereof provided that at least one of said Qs is aryl. More preferred are phosphates wherein each Q is aryl. Other suitable phosphates include diphosphates and polyphosphates having the following formulae

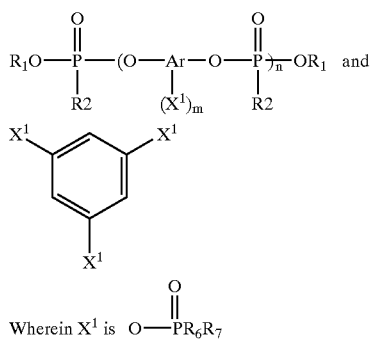

wherein Ar is phenyl, biphenyl with a lower alkyl bridge or triphenyl, each $R_1$ is independently hydrocarbon; $R_2$, $R_6$ and $R_7$ are independently hydrocarbon or hydrocarbonoxy, each $X^1$ is either hydrogen methyl, methoxy or halogen, m is an integer of from 1 to 4; and n is an integer of from about 1 to 30. Preferably, each $R_1$ is independently phenyl or lower alkyl of from 1 to 6 carbon atoms and $R_2$, $R_6$ and $R_7$ are each independently phenyl, lower alkyl of 1 to 6 carbon atoms, phenoxy or (lower) alkoxy of from 1 to 6 carbon atoms.

Examples of suitable phosphates include phenylbisdodecyl phosphate, phenylbisneopentyl phosphate, phenylethylene hydrogen phosphate, phenyl-bis-3,5,5'-trimethylhexyl phosphate, ethyldiphenyl phosphate, 2-ethylhexyl di(p-tolyl), phosphate, diphenyl hydrogen phosphate, bis(2-ethylhexyl)p-tolylphosphate, tritolyl phosphate, bis(2-ethylhexyl)-phenyl phosphate, tri(nonylphenyl)phosphate, phenyl-methyl hydrogen phosphate, di(dodecyl)p-tolyl phosphate, tricresyl phosphate, triphenyl phosphate, isopropylated triphenyl phosphate, halogenated triphenyl phosphate, dibutylphenyl phosphate, 2-chlorethyldiphenyl phosphate, p-tolyl bis(2,5,5'-trimethylhexyl)phosphate, 2-ethylhexyldiphenyl phosphate and the like.

The most preferred phosphates are triphenyl phosphate, the alkylated triphenyl phosphates, including isopropylated and butylated triphenyl phosphates, bis-neopentyl piperidinyl diphosphate, tetraphenyl bisphenol-A diphosphate, tetraphenyl resorcinol diphosphate, hydroquinone diphosphate, bisphenol-A diphosphate, bisphenol-A polyphosphate, mixtures of these compounds and derivatives of these compounds.

Suitable compounds containing a phosphorus-nitrogen bond include phosphonitrilic chloride, phosphorus ester amides, phosphoric acid amides, phosphonic acid amides, and phosphinic acid amides. Bis-phosphoramide materials derived from piperazine and hydroxyaromatic compounds are especially useful.

The level of flame retardant added to the compositions of this invention can range from 0.5 to 30 wt %. A preferred level for the phosphorous flame retardants is from 9% to 17% by weight of the composition. In some embodiments it is preferable to use the phosphorous flame retardants such as triphenyl phosphate in combination with other flame retardants such as hexabromobenzene and optionally antimony oxide.

Suitable phosphorous flame retardant additives are commercially available and methods for preparing the phosphate flame retardants are generally known in the art. As an example, the compounds may be prepared by reacting a halogenated phosphate compound with various dihydric or trihydric phenolic compounds until the desired number of phosphate functional groups are obtained. Examples of the phenolic compounds are dihydroxy aromatic compounds such as resorcinol and hydroquinone.

As reinforcing agents, the compositions of the present invention may contain fiber reinforcement such as glass fibers which greatly increases the flexural strength and modulus as well as the tensile strength of the molded composition obtained therewith. In general, lime-aluminum borosilicate glass that is relatively soda-free ("E" glass) is preferred. Although glass roving may be used, cut fibers are often preferred. The length of such fibers is usually at least 3 mm and a preferred length is in the range of 3 mm to 13 mm. A preferred diameter of the fibers is in the range of about 0.002 mm to about 0.01 mm. The amount of glass fiber employed can range from 0 to 60% by weight of the total composition and is preferably in the range of about 3% to 30% by weight based on the weight of the entire composition. Larger amounts are used where the end use requires a higher degree of stiffness and strength. More preferably, the amount of glass fiber ranges from about 6% to 25% by weight. Carbon fibers, carbon fibrils, Kevlar® fibers and stainless steel fibers and metal coated graphite fibers can also be employed at levels of 0 to 60 wt % preferably in the range of 3 to 25 wt %, more preferably in the range of 7% to 10% by weight. Carbon fibers typically have a length of at least 3 mm, preferably from 3mm to 13 mm. Samples of metal used to coat the graphite fibers include nickel, silver, brass, copper and gold, with nickel being preferred. Fibers and platelets of metals such as aluminum, nickel, iron and bronze are also suitable in amounts up to 60 wt %.

Suitable non-fiberous inorganic fillers include mica clay, glass beads, glass flakes, graphite, aluminum hydrate, calcium carbonate, silica kaolin, barium sulfate, talcum and calcium silicate (Wollastonite). Effective amounts will differ according to the particular agent used, but they are generally in the range of 0.25 to 60 wt % more typically from 1 to 30 wt % and preferably from 3% to 12% by weight based on the weight of the entire composition. Examples of mica include muscovite, phlogopite, biotite, fluorophlogopite, and synthetic mica. Levels of mica are preferably in the range of 0.25% to 30% by weight, based on the weight of the entire composition. Preferred amounts of clay range from 0.25% to 30% by weight, based on the weight of the entire composition.

Suitable pigments include those well known in the art such as $TiO_2$, and carbon black. Suitable stabilizers include zinc sulfide, zinc oxide and magnesium oxide.

While the compositions of this invention preferably are of a reduced viscosity and increased flow, it is contemplated that conventional flow promoters and plasticizers may still be desired for certain embodiments. Examples of suitable flow promoters and plasticizers include the phosphate plasticizers such as cresyl diphenyl phosphate, triphenyl phosphate, tricresyl phosphate, isopropylated and triphenyl phosphate. Chlorinated biphenols and mineral oil are also suitable. When used, the plasticizers are typically employed in an amount of 1–15 wt % based on the weight of the composition.

Suitable antioxidants include hydroxyl amines, hindered phenols such as alkylated monophenols and polyphenols, benzofuranones such as 3-arylbenzofuranone, alkyl and aryl phosphites such as 2,4-di-tert butyl phenol phosphite and tridecyl phosphite, and hindered amines such as dioctyl methylamine oxide and other tertiary amine oxides. Such antioxidants are preferably used in an amount of 0.1 to 1.5 wt %, based on the weight of the composition. Suitable U.V. stabilizers include 4,6-dibenzoyl resorcinols, alkanol amine morpholenes and benzotriazole.

The compositions of this invention may be prepared by well-known procedures. A preferred method of preparation is to first dry blend the polyphenylene ether resin and dendritic polymers and compound the mixture by known techniques such as within an extruder to form a blend. The composition has a reduced viscosity and increased flow as compared to polyphenylene ether resin alone without a significant reduction in HDT values. This composition can be blended with other components or extruded, quenched and chopped into pellets. These pellets can then be melted and molded into articles of a desired shape and size or compounded again to blend with other components before additional processing in preparing finished articles.

Without further elaboration, it is believed that one skilled in the art can, using the preceding description, utilize the present invention to its fullest extent. The entire disclosure of all patents, and publications cited above, are herein incorporated by reference.

Experimental

The examples, comparative examples and controls were prepared by compounding the components identified in Tables 1–4 in a 30 mm Werner and Pfeiderer co-rotating twin screw extruder operating at a temperature of 550° F. (288° C.) with a speed of about 350 rpm. The extrudate was quenched with water and pelletized. The pellets were injection molded using a Van Dorn Demag 120 ton injection molding machine (melt temperature 560° F (290° C.) mold temperature 190° F. (88° C.)) into various specimens/test bars for UL90 flame out tests, HDT values and various physical properties. The polyphenylene ether was PPO®resin (poly(2,6-dimethyl-1,4-phenylene)ether) available from GE Plastics. The polystyrene was GEH1897 high impact polystyrene available from GE Plastics and comprising butadiene rubber. The impact modifier was Kraton® D1101 styrene-butadiene-styrene block copolymer, available from Shell Chemical Co. The Boltron® H20 and Boltron® H30 dendritic polymers were obtained from Perstorp AB, Perstorp Sweden and comprise polyester based dendritic poloymers with hydroxy terminal groups. Nirez® 2150/7042 flow modifier is a terpene phenol available from Arizona Chemical Co. used in the comparative examples. ZnO and ZnS were used as stabilizers in each formulation. The flame retardant formulations also contained the following: FR-RDP tetraphenyl-resorcinol diphosphate flame retardant, available from Akzo Chemical and Nagase America Co., linear low density polyethylene (LLDPE) available from Millenium Petrochemicals, tridecyldiphosphite (TDP) stabilizer, available from GE Specialty Chemicals and filler Teflon fibrils encapsulated with polystyrene-acrylonitrile (TSAN), available from GE Plastics, Netherlands. The amounts utilized for each formulation appears in Tables 1–4.

Heat distortion temperature at 264 psi (⅛ inch) was determined according to the standards in ASTM-D648. Notched Izod was determined by the standards set forth in ASTM-D256 and "Total energy " to failure was determined by standards set forth in ASTM-D3763. Flexural modulus was determined by standards set forth in ASTM-D790, and tensile strength was determined by standards set forth in ASTM-D638. Five bars were tested for each formulation and the average reported in the Tables except for flexural modulus, where 3 bars were tested and averaged and flammability here 10 bars were tested and averaged for most values. Shear viscosity was measured using a Kayeness capillary rheometer.

Comparative Examples A–F

Control X

Comparative Examples A–F and Control X are set forth in Table 1. Control X contains no flow modifier and Comparative Examples A–F employ Nirez terepene phenol flow modifier.

TABLE 1

| Formulation | X | A | B | C | D | E | F |
|---|---|---|---|---|---|---|---|
| .46 IV PPO resin | 50 | 48 | 44 | 40 | 50 | 50 | 50 |
| SBS, D1101 | 5 | 5 | 5 | 5 | 5 | 5 | 5 |
| ZnS | 0.1 | 0.1 | 0.1 | 0.1 | 0.1 | 0.1 | 0.1 |
| ZnO | 0.1 | 0.1 | 0.1 | 0.1 | 0.1 | 0.1 | 0.1 |
| Nirez 2150/7042 |  | 2 | 6 | 10 | 2 | 6 | 10 |
| Boltron H20 |  |  |  |  |  |  |  |
| Boltron H30 |  |  |  |  |  |  |  |
| PS, HIPS GEH 1897 | 45 | 45 | 45 | 45 | 43 | 39 | 35 |
| HDT @ 264 psi (⅛") ° F. | 245 | 238 | 234 | 235 | 240 | 242 | 251 |
| Notched Izod, 73 F. ft-lb/in | 4.52 | 4.82 | 4.94 | 4.49 | 4.39 | 4.38 | 4.56 |
| Total Energy, 73 F. ft-lb | 39.9 | 36.4 | 33.5 | 31.5 | 39.9 | 39.5 | 34.0 |
| Flexural Modulus, 73 F. (⅛") kpsi | 347 | 357 | 340 | 338 | 352 | 349 | 352 |
| Flexural Str. @ yield, 73 F. (⅛") psi | 13,660 | 14,130 | 13,530 | 13,430 | 14,670 | 14,890 | 15,060 |
| Tensile Str. @ yield, 73 F. 2 in/m/in, psi | 8,230 | 8,190 | 7,880 | 7,730 | 8,510 | 8,520 | 8,660 |

TABLE 1-continued

| Formulation | X | A | B | C | D | E | F |
|---|---|---|---|---|---|---|---|
| T. Strength @ break 73 F. 2 in/m/in, psi | 7,240 | 7,160 | 6,890 | 6,680 | 7,330 | 7,250 | 7,230 |
| T. Elongation @ yield, 73 F. 2 in/m/in, % | 3.93 | 3.89 | 3.46 | 3.20 | 3.84 | 3.85 | 3.76 |
| T. Elongation @ break, 73 F. 2 in/m/in, % | 27.6 | 30.1 | 29.5 | 31.3 | 27.3 | 26.4 | 20.5 |
| Kayeness Rheology @ 300 C. Position, Pa-s Rate (1/s) | | | | | | | |
| 100 | 1009.2 | 932.2 | 681.09 | 515.3 | 1012.7 | 858.9 | 747.6 |
| 500 | 432.4 | 398.6 | 307.8 | 237.5 | 428.4 | 382.1 | 338.2 |
| 1000 | 286.5 | 262.8 | 207.3 | 160.9 | 281.6 | 255.7 | 228.9 |
| 1500 | 222.3 | 203.1 | 162.1 | 126.1 | 217.4 | 199.2 | 179.6 |

EXAMPLES 1–6

Control Y

Examples 1–6 and Control Y are set forth in Table 2. Control Y contains no flow modifier and Examples 1–6 employ BOLTRON H20 dendritic polymer as a flow modifier.

TABLE 2

| Formulation | Y | 1 | 2 | 3 | 4 | 5 |
|---|---|---|---|---|---|---|
| .46 IV PPO resin | 50 | 48 | 44 | 40 | 50 | 50 |
| SBS, D1101 | 5 | 5 | 5 | 5 | 5 | 5 |
| ZnS | 0.1 | 0.1 | 0.1 | 0.1 | 0.1 | 0.1 |
| ZnO | 0.1 | 0.1 | 0.1 | 0.1 | 0.1 | 0.1 |
| Nirez 2150/7042 | | | | | | |
| Boltron H20 | | 2 | 6 | 10 | 2 | 6 |
| Boltron H30 | | | | | | |
| PS, HIPS GEH 1897 | 45 | 45 | 45 | 45 | 43 | 39 |
| HDT @ 264 psi (1/8") ° F. | 248 | 242 | 241 | 232 | 247 | 245 |
| Notched Izod, 73 F ft-lb/in | 4.53 | 4.80 | 5.12 | NO | 4.40 | 5.60 |
| Total Energy, 73 F ft-lb | 44.0 | 42.4 | 19.1 | | 34.8 | 13.0 |
| Flexural Modulus, 73 F (1/8") kpsi | 347 | 342 | 320 | 292 | 336 | 323 |
| Flexural Str. @ yield, 73 F (1/8") psi | 14,840 | 14,390 | 13,350 | 10,670 | 13,610 | 13,350 |
| Tensile Str. @ yield, 73 F 2 in/m/in, psi | 8,460 | 8,100 | 7,520 | 5,810 | 7,990 | 8,150 |
| T. Strength @ break 73 F 2 in/m/in, psi | 7,330 | 7,080 | 6,730 | 5,720 | 7,010 | 7,110 |
| T. Elongation @ yield, 73 F 2 in/m/in, % | 3.86 | 3.68 | 3.51 | 2.40 | 3.89 | 3.77 |
| T. Elongation @ break, 73 F 2 in/m/in, % | 26.8 | 30.4 | 25.1 | 9.6 | 33.3 | 36.4 |
| Kayeness Rheology @ 300 C Position, Pa-s Rate (1/s) | | | | | | |
| 100 | 1017.1 | 764.1 | 479.9 | 212.1 | 776.4 | 447 |
| 500 | 437.2 | 343.1 | 168.9 | 45.4 | 353 | 164.3 |
| 1000 | 289.1 | 230.3 | 99.8 | 26.1 | 236.2 | 107.4 |
| 1500 | 223.8 | 179.7 | 71.8 | 19.5 | 183.5 | 83.9 |

EXAMPLES 7–10

Examples 7–10 are set forth in Table 3. Examples 7–10 employ BOLTRON H30 dendritic polymer as a flow modifier.

TABLE 3

| Formulation | 7 | 8 | 9 | 10 |
|---|---|---|---|---|
| .46 IV PPO resin | 48 | 44 | 50 | 50 |
| SBS, D1101 | 5 | 5 | 5 | 5 |
| ZnS | 0.1 | 0.1 | 0.1 | 0.1 |
| ZnO | 0.1 | 0.1 | 0.1 | 0.1 |
| Boltron H30 | 2 | 6 | 2 | 6 |
| PS, HIPS GEH 1897 | 45 | 45 | 43 | 39 |
| HDT @ 264 psi (⅛")° F. | 245 | 237 | 246 | 250 |
| Notched Izod, 73 F ft-lb/in | 4.40 | 5.27 | 4.40 | 5.42 |
| Total Energy, 73 F ft-lb | 31.3 | 14.9 | 29.2 | 18.1 |
| Flexural Modulus, 73 F (⅛") kpsi | 334 | 314 | 333 | 321 |
| Flexural Str. @ yield, 73 F (⅛") psi | 14,140 | 12,990 | 14,270 | 13,700 |
| Tensile Str. @ yield, 73 F 2 in/m/in, psi | 7,730 | 7,400 | 7,930 | 8,030 |
| T. Strength @ break 73 F 2 in/m/in, psi | 6,880 | 6,680 | 6,960 | 7,000 |
| T. Elongation @ yield, 73 F 2 in/m/in, % | 3.53 | 3.35 | 3.83 | 3.84 |
| T. Elongation @ break, 73 F 2 in/m/in, % | 31.4 | 28.3 | 33.2 | 33.9 |
| Kayeness Rheology @ 300 C Position, Pa-s | | | | |
| Rate (1/s) | | | | |
| 100 | 741.9 | 260.8 | 803.3 | 293 |
| 500 | 334.9 | 94.7 | 365.8 | 111.2 |
| 1000 | 225.1 | 72.5 | 247.3 | 84.4 |
| 1500 | 175.7 | 65.1 | 193.8 | 74.7 |

A comparison of the data in Table 1 to the data in Tables 2 and 3, shows the addition of dendritic polymer to a polyphenylene ether formulation provides significantly higher reductions in Kayeness rheology at similar loadings to the Nirez 2150/7042 terpene phenol flow modifier. Amounts of dendritic polymer as a low as 2% wt show significant effects in reducing viscosity and increasing flow. Heat distortion temperatures do not vary significantly until much higher loadings (10% wt) were introduced. The data also show that impact properties were reduced, but to acceptable levels, particularly at lower concentrations of the dendritic polymer.

EXAMPLES 11–22

Comparative Examples G–F and Controls Q and R

The compositions for Examples 11–22, Comparative examples G–L and Controls Q and R are set forth in Table 4. Examples 11–22 employ either BOLTRON H20 or BOLTRON H30 dendritic polymer as a flow modifier. Comparative examples G–L employ Nirez terpene phenol as an impact modifier and Controls Q and R do not contain any flow modifier.

TABLE 4

| FORMULATION | Q | G | H | I | R | J | K | L | 11 | 12 |
|---|---|---|---|---|---|---|---|---|---|---|
| .46 IV PPO | 50.5 | 48.5 | 44.5 | 40.5 | 50.5 | 50.5 | 50.5 | 50.5 | 48.5 | 44.5 |
| SBS, Kraton D1101 | 2.4 | 2.4 | 2.4 | 2.4 | 2.4 | 2.4 | 2.4 | 2.4 | 2.4 | 2.4 |
| LLDPE | 1.2 | 1.2 | 1.2 | 1.2 | 1.2 | 1.2 | 1.2 | 1.2 | 1.2 | 1.2 |
| TDP | 0.4 | 0.4 | 0.4 | 0.4 | 0.4 | 0.4 | 0.4 | 0.4 | 0.4 | 0.4 |
| ZnS | 0.1 | 0.1 | 0.1 | 0.1 | 0.1 | 0.1 | 0.1 | 0.1 | 0.1 | 0.1 |
| ZnO | 0.1 | 0.1 | 0.1 | 0.1 | 0.1 | 0.1 | 0.1 | 0.1 | 0.1 | 0.1 |
| TSAN | 0.2 | 0.2 | 0.2 | 0.2 | 0.2 | 0.2 | 0.2 | 0.2 | 0.2 | 0.2 |
| Nirez 2150/7042 | | 2 | 6 | 10 | | 2 | 6 | 10 | | |
| Boltron H20 | | | | | | | | | 2.0 | 6.0 |
| Boltron H30 | | | | | | | | | | |
| PS. HIPS GEH 1897 | 28.5 | 28.5 | 28.5 | 28.5 | 28.5 | 26.5 | 22.5 | 18.5 | 28.5 | 28.5 |
| Liquid FR RDP FR pump | 16.7 | 16.7 | 16.7 | 16.7 | 16.7 | 16.7 | 16.7 | 16.7 | 16.7 | 16.7 |
| TOTAL PARTS | 100.1 | 100.2 | 100.2 | 100.2 | 100.1 | 100.2 | 100.2 | 100.2 | 100.2 | 100.2 |
| HDT @ 264 psi (⅛") deg F. | | 172 | 168 | 161 | 174 | 174 | 175 | 174 | 174 | 175 |
| Notched Izod, 73 F., Ft-lb/in | 5.17 | 5.03 | 3.06 | 2.32 | 5.40 | 5.08 | 3.01 | 2.09 | 5.81 | 2.49 |
| Total Energy, 73 F., Ft-lb | 30.8 | 34.3 | 28.9 | 22.8 | 37.6 | 38.7 | 29.4 | 20.8 | 34.6 | 8.5 |
| Flexural Modulus, 73 F. (⅛") kpsi | | 358 | 362 | 367 | 367 | 366 | 369 | 393 | 342 | 305 |
| Flexural Str. @ yield, 73 F. (⅛") psi | | 13,510 | 13,160 | 13,080 | 13,650 | 13,850 | 14,480 | 15,210 | 12,710 | 11,340 |
| Tensile Str. @ yield, 73 F. 2 in/m/in, Psi | 8,240 | 8,520 | 8,460 | 8,400 | 8,490 | 8,650 | 9,080 | 9,520 | 8,220 | 7,320 |
| T. Strength @ break, 73 F. 2 in/m/in psi | 6,860 | 7,120 | 7,360 | 7,240 | 6,700 | 7,000 | 7,900 | 8,830 | 6,470 | 6,820 |
| T. Elongation @ yield, 73 F. 2 in/m/in, % | 3.63 | 3.68 | 3.44 | 3.38 | 3.75 | 3.75 | 3.81 | 3.80 | 3.74 | 3.65 |
| T. Elongation @ break, 73 F. 2 in/m/in % | 11.9 | 8.7 | 7.5 | 7.6 | 10.2 | 8.8 | 7.0 | 5.5 | 9.6 | 8.3 |
| Kayeness Rheology @ 230° C. position, Pa-s | | | | | | | | | | |

TABLE 4-continued

| Rate (1/s) | | | | | | | | | | |
|---|---|---|---|---|---|---|---|---|---|---|
| 100 | 2032 | 1764 | 1360 | 984 | 1879 | 1947 | 1669 | 1510 | 1898 | 432 |
| 500 | 735 | 652 | 519 | 385 | 716 | 733 | 639 | 588 | 723 | 232 |
| 1000 | 467 | 414 | 333 | 248 | 463 | 472 | 414 | 384 | 469 | 197 |
| 1500 | 357 | 315 | 254 | 191 | 357 | 364 | 319 | 297 | 362 | 183 |
| Transfer Pressure psi | 1212 | 1173 | 1062 | 883 | 1037 | 1154 | 1064 | 1040 | 1145 | 1126 |
| UL-94 Flammability | | | | | | | | | | |
| 10 bar statistics | | | | | | | | | | |
| 1st Ignition | | | | | | | | | | |
| Ave. | 1.5 | 1.7 | 3.8 | 2.3 | 1.4 | 1.4 | 1.5 | 1.5 | 1.7 | 3.1 |
| Std. Dev. | 0.3 | 0.5 | 4.7 | 1.0 | 0.3 | 0.3 | 0.3 | 0.4 | 0.4 | 3.3 |
| 2nd Ignition | | | | | | | | | | |
| Ave. | 4.2 | 3.0 | 7.6 | 4.9 | 5.4 | 3.4 | 3.0 | 2.9 | 6.2 | 7.4 |
| Std. Dev. | 2.8 | 1.5 | 7.5 | 2.6 | 3.8 | 2.0 | 1.7 | 1.2 | 3.2 | 8.0 |
| 10 Bar Total | | | | | | | | | | |
| Ave. | 2.9 | 2.3 | 5.7 | 3.6 | 3.4 | 2.4 | 2.2 | 2.2 | 4.0 | 5.2 |
| Std. Dev. | 2.4 | 1.3 | 6.4 | 2.3 | 3.3 | 1.7 | 1.4 | 1.2 | 3.2 | 6.3 |
| Range | 1.2–10.0 | 1.1–6.4 | 1.2–26.8 | 1.3–9.8 | 1.0–14.3 | 1.1–8.7 | 1.1–6.4 | 1.1–6.0 | 1.1–11.6 | 1.4–23.1 |
| UL Rating | V-0 | V-0 | V-1 | V-0 | V-0 | V-0 | V-0 | V-0 | V-0 | V-1 |
| FORMULATION | 13 | 14 | 15 | 16 | 17 | 18 | 19 | 20 | 21 | 22 |
| .46 IV PPO | 40.5 | 50.5 | 50.5 | 50.5 | 48.5 | 44.5 | 40.5 | 50.5 | 50.5 | 50.5 |
| SBS, Kraton D1101 | 2.4 | 2.4 | 2.4 | 2.4 | 2.4 | 2.4 | 2.4 | 2.4 | 2.4 | 2.4 |
| LLDPE | 1.2 | 1.2 | 1.2 | 1.2 | 1.2 | 1.2 | 1.2 | 1.2 | 1.2 | 1.2 |
| TDP | 0.4 | 0.4 | 0.4 | 0.4 | 0.4 | 0.4 | 0.4 | 0.4 | 0.4 | 0.4 |
| ZnS | 0.1 | 0.1 | 0.1 | 0.1 | 0.1 | 0.1 | 0.1 | 0.1 | 0.1 | 0.1 |
| ZnO | 0.1 | 0.1 | 0.1 | 0.1 | 0.1 | 0.1 | 0.1 | 0.1 | 0.1 | 0.1 |
| TSAN | 0.2 | 0.2 | 0.2 | 0.2 | 0.2 | 0.2 | 0.2 | 0.2 | 0.2 | 0.2 |
| Nirez 2150/7042 | | | | | | | | | | |
| Boltron H20 | 10.0 | 2.0 | 6.0 | 10.0 | | | | | | |
| Boltron H30 | | | | | 2.0 | 6.0 | 10.0 | 2.0 | 6.0 | 10.0 |
| PS. HIPS GEH 1897 | 28.5 | 26.5 | 22.5 | 18.5 | 28.5 | 28.5 | 28.5 | 26.5 | 22.5 | 18.5 |
| Liquid FR RDP | 16.7 | 16.7 | 16.7 | 16.7 | 16.7 | 16.7 | 16.7 | 16.7 | 16.7 | 16.7 |
| FR pump | | | | | | | | | | |
| TOTAL PARTS | 100.2 | 100.2 | 100.2 | 100.2 | 100.2 | 100.2 | 100.2 | 100.2 | 100.2 | 100.2 |
| HDT @ 264 psi (1/8") deg F. | 167 | 176 | 176 | 175 | 174 | 171 | 169 | 175 | 176 | 174 |
| Notched Izod, 73 F., Ft-lb/in | 1.04 | 6.10 | 2.06 | 1.62 | 5.90 | 2.79 | 1.42 | 5.99 | 2.06 | 0.97 |
| Total Energy, 73 F., Ft-lb | 4.8 | 36.7 | 7.8 | 3.7 | 34.1 | 7.8 | 4.8 | 36.4 | 8.3 | 3.2 |
| Flexural Modulus, 73 F. (1/8") kpsi | 266 | 349 | 311 | | 354 | 320 | 280 | 359 | 332 | 284 |
| Flexural Str. @ yield, 73 F. (1/8") psi | 8,130 | 13,170 | 11,930 | | 12,880 | 11,540 | | | | |
| Tensile Str. @ yield, 73 F. 2 in/m/in, Psi | 5,600 | 8,430 | 7,690 | | 8,350 | 7,750 | 5240 | 8,660 | 8,180 | 4,960 |
| T. Strength @ break, 73 F. 2 in/m/in psi | 5,630 | 6,690 | 7,500 | | 6,560 | 7,000 | 5140 | 6,790 | 7,620 | 5,100 |
| T. Elongation @ yield, 73 F. 2 in/m/in, % | 2.71 | 3.88 | 3.76 | | 3.65 | 3.65 | 2.30 | 3.81 | 3.97 | 2.11 |
| T. Elongation @ break, 73 F. 2 in/m/in % | 2.7 | 10.2 | 4.9 | | 11.5 | 8.7 | 2.5 | 10.5 | 7.9 | 2.5 |
| Kayeness Rheology @ 230° C. position, Pa-s | | | | | | | | | | |
| Rate (1/s) | | | | | | | | | | |
| 100 | 265 | 1796 | 305 | 296 | 1289 | 294 | 251 | 1392 | 266 | 256 |
| 500 | 111 | 719 | 177 | 141 | 568 | 199 | 130 | 636 | 199 | 143 |
| 1000 | 83 | 467 | 163 | 107 | 394 | 184 | 107 | 438 | 192 | 117 |
| 1500 | 71 | 359 | 162 | 93 | 318 | 180 | 97 | 348 | 192 | 105 |
| Transfer Pressure psi | 768 | 1241 | 1005 | — | 1150 | | | | | |
| UL-94 Flammability | | | | | | | | | | |
| 10 bar statistics | | | | | | | | | | |
| 1st Ignition | | | | | | | | | | |
| Ave. | — | 2.1 | 2.2 | — | 2.3 | 3.2 | 4.5 | 2.1 | 2.4 | 2.2 |
| Std. Dev. | — | 0.1 | 0.8 | — | 1.4 | 2.1 | 4.2 | 1.0 | 1.3 | 1.0 |
| 2nd Ignition | | | | | | | | | | |
| Ave. | — | 4.6 | 5.5 | — | 11.0 | 9.6 | 4.6 | 4.2 | 5.2 | 5.7 |
| Std. Dev. | — | 1.7 | 4.3 | — | 9.6 | 10.1 | 1.3 | 2.7 | 2.7 | 3.9 |

TABLE 4-continued

| 10 Bar Total | | | | | | | | | | |
|---|---|---|---|---|---|---|---|---|---|---|
| Ave. | — | 3.3 | 3.8 | — | 6.6 | 6.4 | 4.5 | 3.1 | 3.8 | 3.9 |
| Std. Dev. | — | 1.8 | 3.5 | — | 8.0 | 7.8 | 2.9 | 2.3 | 2.5 | 3.3 |
| Range | — | 1.2–8.1 | 1.5–16.9 | — | 1.2–27.9 | 1.4–34.0 | 1.9–11.9 | 1.3–9.4 | 1.5–10.4 | 1.4–11.9 |
| UL Rating | — | V-0 | V-0 | — | V-1 | V-1 | V-1 | V-0 | V-0 | V-1 |

The results in Table 4 show that high flow is still obtained with the use of the flame retardant additive and that flammability is at acceptable levels with the addition of the dendritic polymers, particularly at the lower loadings of dendritic polymers.

The preceding examples can be repeated with similar success by substituting the generically or specifically described reactants and/or operating conditions of this invention for those used in the these examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A composition comprising:
   a polyphenylene ether resin, wherein the polyphenylene ether resin has an intrinsic viscosity of more than 0.2 dl/g as measured in chloroform at 25° C.; and
   a dendritic polymer having a melt viscosity in the range of 1 to 250 Pa at a temperature of 110° C. and shear rate of 30 sec$^{-1}$, wherein the compositions contains 30 wt % or less of the dendritic polymer and wherein the dendritic polymer is of a starburst configuration and comprises polyester branching units bound to a core.

2. A composition, as in claim 1, wherein the polyester branching units of the dendritic polymer have hydroxy functional groups at the terminal end that provide hydroxy groups at the periphery of the dendritic polymer.

3. A composition, as in claim 2, where a portion of the hydroxy groups on the dendritic polymer is reacted to provide chain termination or functional groups.

4. A composition, as in claim 1, wherein the dendritic polymer has a weight average molecular weight, as determined by gel permeation chromatography, within the range of 1,000 to 5,000.

5. A composition, as in claim 1, which additionally comprises an impact modifier.

6. A composition which comprises a polyphenylene ether resin, an alkenyl aromatic resin, a dendritic polymer having a melt viscosity in the range of 1 to 250 Pa at a temperature of 110° C. and shear rate of 30 sec$^{-1}$, wherein the dendritic polymer has a starburst structure and comprises polyester branching units bound to a core and wherein the dendritic polymer has hydroxyl or epoxy terminated end groups.

7. A composition, as in claim 6, wherein a portion of the hydroxyl groups on the dendritic polymer is reacted to provide chain termination or functional groups.

8. A composition, as in claim 6, wherein the dendritic polymer has a weight average molecular weight, as determined by gel permeation chromatography, within the range of 1,000 to 5,000.

9. A composition, as in claim 6, wherein the polyester branching units of the dendritic polymer have hydroxy or epoxy functional groups at the terminal end that provide hydroxy or epoxy groups at the periphery of the dendritic polymer.

10. A composition, as in claim 6, wherein the polyphenylene ether resin has an intrinsic viscosity of more than 0.2 dl/g as measured in chloroform at 25° C., and the composition contains 30 wt % or less of the dendritic polymer.

11. A composition, as in claim 6, wherein the alkenyl aromatic resin comprises polystyrene homopolymers, polystyrene copolymers, rubber modified polystyrene or high impact polystyrene.

12. A composition, as in claim 6, which additionally contains at least one additive selected from the group consisting of impact modifiers, flame retardants, plasticizers, antioxidants, fillers, reinforcing agents, stabilizers, antistatic agents, lubricants, colorants, dyes, pigments and flow modifiers.

13. A composition, as in claim 6, which additionally comprises an impact modifier.

14. The composition, as in claim 6, which comprises 10 wt % or less of the dendritic polymer.

15. A composition, as claim 6, which comprises 6 wt % or less of the dendritic polymer.

16. A composition as, in claim 6, which comprises 4 wt % or less of the dendritic polymer or less.

17. A composition, as in claim 6, which comprises 2 wt % or less of the dendritic polymer.

18. A composition comprising:
   a polyphenylene ether resin, wherein the polyplienylene ether resin has an intrinsic viscosity of more than 0.2 dl/g as measured in chloroform at 25° C.;
   a dendritic polymer having a melt viscosity in the range of 1 to 250 Pa at a temperature of 110° C. and shear rate of 30 sec$^{-1}$, wherein the compositions contains 30 wt % or less of the dendritic polymer and the dendritic polymer is of a starburst configuration having polyester branching units bound to a core with hydroxy groups at the periphery; and
   an impact modifier.

19. A composition as in claim 18, which additionally comprises an alkenyl aromatic resin.

20. A composition, as in claim 19, wherein the alkenyl aromatic resin comprises polystyrene homopolymers, copolymers of styrene, a rubber modified polystyrene or high impact polystyrene.

21. A composition as in claim 18, wherein the dendritic polymer has a weight average molecular weight, as determined by gel permeation chromatography, within the range of 1,000 to 5,000.

22. A composition as in claim 18, wherein the polyphenylene resin is poly(2,6-dimethyl-1,4-phenylene)ether resin or a copolymer of 2,6-dimethyl-phenol and 2,4,6-trimethylphenol.

23. A composition as in claim 18, which comprises 10 wt % or less of the dendritic polymer.

24. A composition as claim 18, which comprises 6 wt % or less of the dendritic polymer.

25. A composition as, in claim 18, which comprises 4 wt % or less of the dendritic polymer.

26. A composition as in claim 18, which comprises 2 wt % or less of the dendritic polymer.

27. A composition as in claim 18, which additionally contains at least one additive selected from the group consisting of flame retardants, plasticizers, antioxidants, fillers, reinforcing agents, stabilizers, antistatic agents, lubricants, colorants, dyes, pigments and flow modifiers.

28. A composition which comprises a polyphenylene ether resin, an alkenyl aromatic resin, and a dendritic polymer having a melt viscosity in the range of 1 to 250 Pa at a temperature of 110° C. and shear rate of 30 $\sec^{-1}$, wherein the dendritic polymer has a starburst structure and comprises polyester branching units bound to a core.

29. A composition as in claim 28, wherein the dendritic polymer has hydroxy groups, wherein a portion of the hydroxy groups is reacted to provide chain termination or functional groups.

30. A composition as in claim 28, wherein the dendritic polymer has a weight average molecular weight, as determined by gel permeation chromotography, within the range of 1,000 to 5,000.

31. A composition as in claim 28, wherein the polyester branching units of the dendritic polymer have hydroxy or epoxy functional groups at the terminal end that provide hydroxy Or epoxy groups at the periphery of the dendritic polymer.

32. A composition as in claim 28, wherein the polyphenylene ether resin has an intrinsic viscosity of more than 0.2 dl/g as measured in chloroform at 25° C., and the composition contains 30 wt % or less of the dendritic polymer.

33. A composition as in claim 28, wherein the alkenyl aromatic resin comprises polystyrene homopolymers, polystyrene copolymers, rubber modified polystyrene or high impact polystyrene.

34. A composition as in claim 28, which additionally contains at least one additive selected from the group consisting of flame retardants, plasticizers, antioxidants, fillers, reinforcing agents, stabilizers, antistatic agents, lubricants, colorants, dyes, pigments and flow modifiers.

35. A composition as in claim 28, which additionally comprises an impact modifier.

36. The composition as in claim 28, which comprises 10 wt % or less of the dendritic polymer.

37. A composition as claim 28, which comprises 6 wt % or less of the dendritic polymer.

38. A composition as in claim 28, which comprises 4 wt % or less of the dendritic polymer or less.

39. A composition as claim 28, which comprises 2 wt % or less of the dendritic polymer.

* * * * *